June 3, 1924.

J. H. McELROY

RAKE

Filed May 31, 1923

1,496,008

INVENTOR
J. H. McELROY
By Egerton R. Case
Atty.

Patented June 3, 1924.

1,496,008

UNITED STATES PATENT OFFICE.

JAMES HUGH McELROY, OF PUCKASAW, VIA WHITE RIVER, ONTARIO, CANADA.

RAKE.

Application filed May 31, 1923. Serial No. 642,413.

*To all whom it may concern:*

Be it known that I, JAMES HUGH MCELROY, a subject of the King of Great Britain, residing in Puckasaw, via White River, in the Province of Ontario, Canada, have invented certain new and useful Improvements in Rakes, of which the following is a specification.

My invention relates to improvements in rakes, and more particularly relates to that type of rake used in raking up leaves, and the object of my invention is to make a rake more or less self-cleaning so that the leaves and other vegetable matter attaching to the teeth may be readily removed therefrom, and in the following specification, and the drawings forming part thereof, I shall show a conventional type of rake associated with means to effect the purpose in view.

Figure 1:
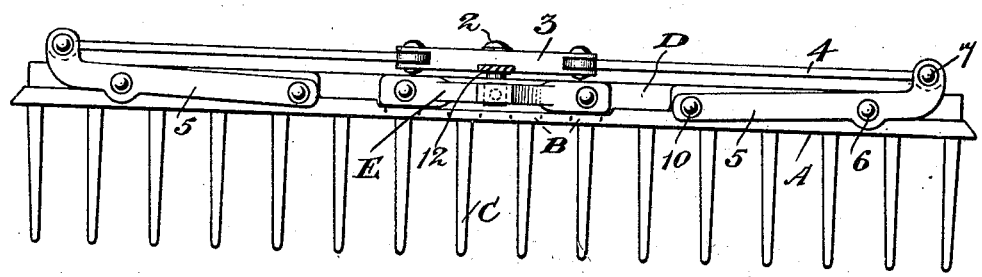
Figure 2:
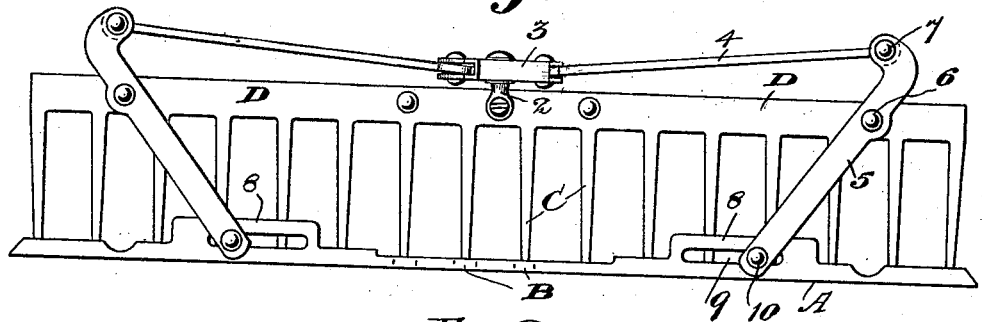
Figure 3:
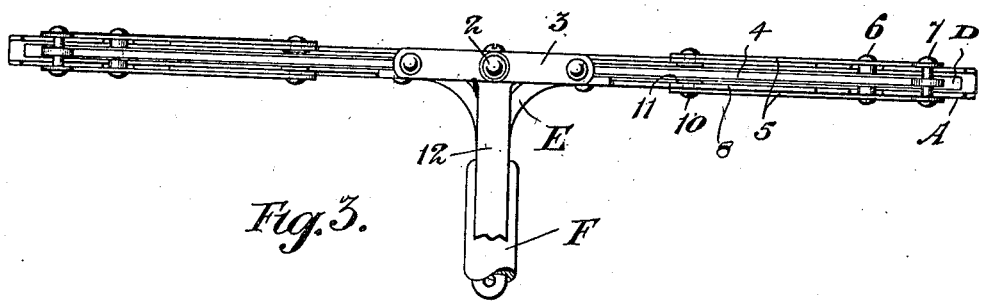
Figure 4:
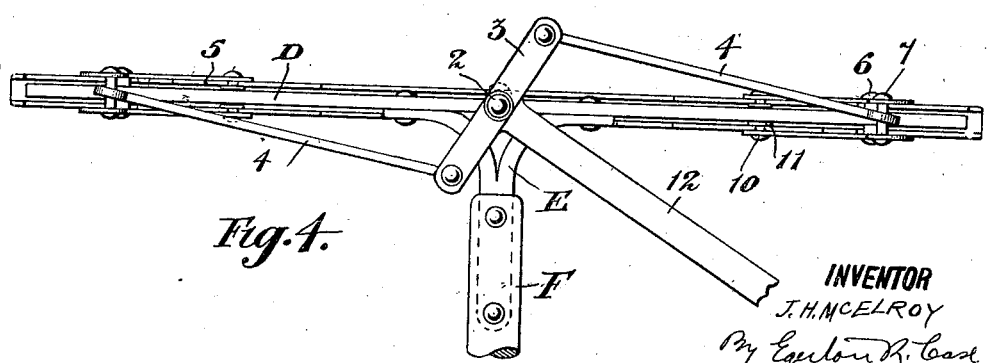

Fig. 1 is a side elevation of my rake, with the cleaning mechanism closed, and Fig. 2 is an elevation of the rake from the side opposite to that illustrated in Fig. 1, showing the cleaning mechanism open, and Figs. 3 and 4 are plan views of the parts shown respectively in Figs. 1 and 2.

In the drawings, like characters of reference refer to the same parts.

In the disclosure made of my invention I show a cleaning bar A provided with a plurality of holes B each of said holes being in alignment with its associated tooth. The teeth C are attached to the back or bar D, or integrally formed therewith, as is common in the art, and this back or bar D is provided with a coupling element E whereby any suitable handle F is associated with the rake.

Pivotally coupled to the bar D midway the length thereof, as by means of a stud 2 fixedly carried by said bar, is a lever 3, to each end of which is pivoted a link rod 4.

A pair of levers 5 is pivoted to the bar D by any suitable pivoting means 6, each lever of each pair being located at one side of said bar, and the upper ends of each pair of these levers are pivotally connected each to its associated link rod 4 as shown at 7. As is clearly shown in the drawings, a pair of levers 5 is located near each end of the rake.

The cleaning bar A is provided with a pair of flanges 8, located at opposite sides of the teeth C and each of these flanges is longitudinally slotted as shown at 9. Held in the lower end of each lever 5 and extending through each its associated slot 9, is a pin 10. Each of these pins is provided with a head 11, adapted to engage with the inner side of the flanges 8 so as to hold the bar A and the levers 5 in co-operative relationship.

Carried by the lever 3 is any suitable lever 12 adapted to be moved by the user of the rake in either direction so that through the medium of the elements before-described, the cleaning bar A may be manipulated.

When the cleaning bar A is in closed position, the lever 12 of course will occupy a position parallel to the handle F.

It is apparent from the drawings that the lever 3 projects equal distances beyond the stud 2, and that the fulcrum 6 for each pair of levers 5 is much nearer the upper ends than the lower ends of these levers: in other words, there is a much longer leverage below the pivoting means 6 than above the same.

What I claim is:

1. In a rake, the combination with the back and the teeth associated therewith, of a cleaning bar provided with a plurality of apertures which permit said bar to be passed over said teeth; a lever pivoted to said back, midway its ends; levers pivoted to said back near each end of the rake; link rods coupling the upper ends of said levers to said first-mentioned lever, and lost motion coupling means for the lower end of said second-mentioned levers to said cleaning bar.

2. In a rake, the combination with the back and the teeth associated therewith, of a cleaning bar provided with a plurality of apertures which permit said bar to be passed over said teeth, and further provided with pairs of longitudinal slotted flanges; a lever pivoted to said back, midway its ends; levers pivoted to said back near each end of the rake; link rods coupling the upper ends of said levers to said first-mentioned lever, and a pin carried by the lower ends of said second-mentioned levers whereby these lower ends are associated with said slotted flanges.

3. In a rake, the combination with the back and the teeth associated therewith, of a cleaning bar provided with a plurality of apertures which permit said bar to be passed over said teeth; a lever pivoted to said back, midway its ends; levers pivoted to said back near each end of the rake, so that the length of each lever above its pivoting means will be much shorter than the length of each lever below said pivoting means; link rods coupling the upper ends of said levers to said first-mentioned lever, and flexible coupling means for the lower end of said second-mentioned levers to said cleaning bar.

JAMES HUGH McELROY.